Sept. 19, 1967  C. V. BELANGER  3,341,930
METHOD AND TOOL FOR EXTRACTING AND INSERTING HEAT
EXCHANGER TUBES
Filed March 24, 1964  2 Sheets-Sheet 1
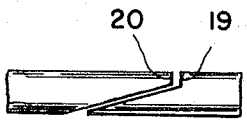
FIG. V
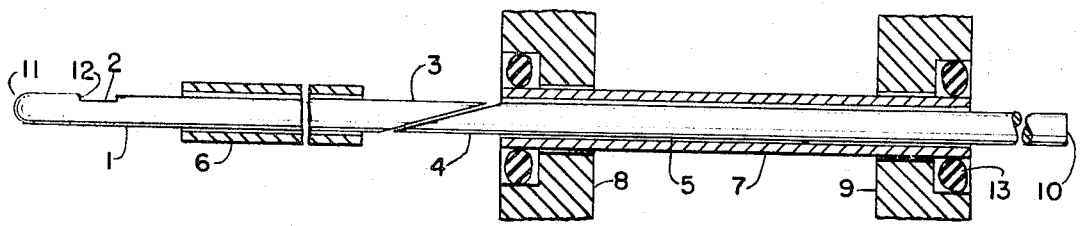
FIG. I
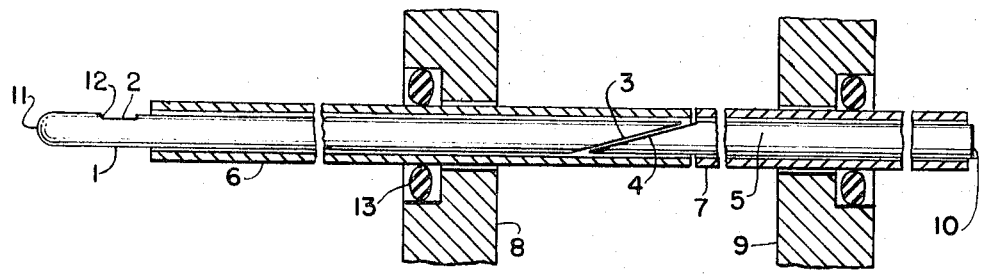
FIG. II
INVENTOR.
Celestin Victor Belanger

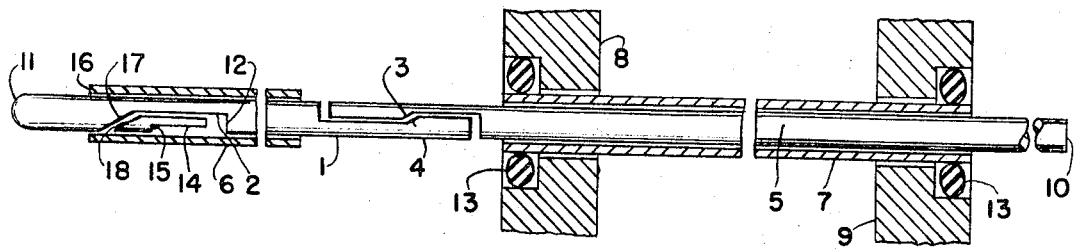
FIG. III
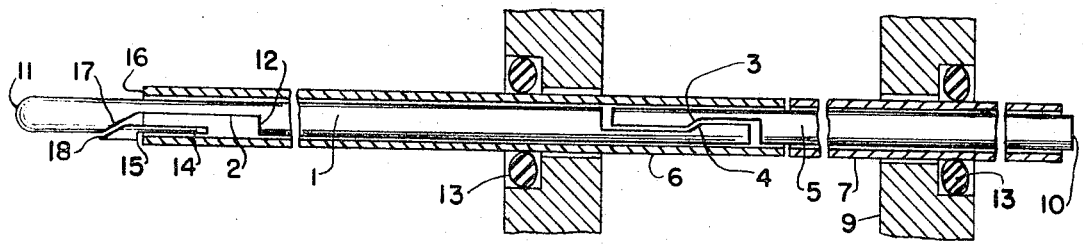
FIG. IV

United States Patent Office 3,341,930
Patented Sept. 19, 1967

3,341,930
METHOD AND TOOL FOR EXTRACTING AND
INSERTING HEAT EXCHANGER TUBES
Celestin Victor Belanger, Beaumont, Tex., assignor to
Henry W. Allen, trustee, Beaumont, Tex.
Filed Mar. 24, 1964, Ser. No. 354,333
5 Claims. (Cl. 29—401)

My invention relates to a combination tube extractor and tube inserting tool for use in extracting a tube from a heat exchanger bundle and inserting one simultaneously in its place in one operation when the bundle is being retubed or when tubes are removed for cleaning and are replaced with clean tubes.

The object of my invention is to provide a tool that will remove a tube from a heat exchanger of the type wherein the tubes are not permanently fixed to the tube sheets and at the same time insert a new or cleaned tube in its place in one operation.

Another object is to provide a tool for removing a tube and inserting another in its place simultaneously whereby no impact force is imposed upon the surface areas composing the ends of the tubes being removed or inserted but instead the impact force being distributed as some vector quantity of the total impact force on the inside surfaces of the tubes by a wedging action of the removing and inserting tool to produce a friction hold between the outside surface of the tool and the inside surfaces of the tubes.

Another object is to provide a tool for aligning and abutting a tube in a heat exchanger bundle with a replacement tube throughout the function of removing the tube from the bundle and inserting the other simultaneously in its place.

Another object is to provide a tool that can be quickly disengaged simultaneously from a tube inserted in a heat exchanger bundle and a tube simultaneously extracted from the heat exchanger bundle.

Another object is to provide a method for removing a tube from a heat exchanger bundle and inserting another simultaneously in its place.

Heat exchanger bundles, particularly of the shell and floating head type used primarily in refineries and chemical industries, which do not have the tubes fixed to the tube sheets are adapted to be removed from the shells for cleaning or retubing. The cleaning frequency is much more often than retubing in most instances. These type bundles range in length from a few feet to 20 feet and have the number of tubes varying from a few to 3000. The sizes of tubes vary from ¼" to 2" in outside diameter. The bundles of the most common sizes are constructed of approximately 1000—¾ inch outside diameter by 16 feet long tubes with tube sheets at each end and baffles in between for deflecting the flow back and forth across the tubes and also acting as intermediate supports for the tubes in the longer bundles. The numbers of baffles varies from a few to 25 or 30 and such baffles are constructed in the form of substantially semi-circular plates of a slightly less diameter than the inside diameter of the shell. These are spaced alternately throughout the length of the bundle to divert the flow of the fluid back and forth across the tubes in its travel from the inlet at one end of the shell to the outlet at the other end of the shell. These baffles have tube holes on the identical spacing and layout pattern as the tube sheets and are aligned in the baffle assembly with the respective holes in the tube sheets whereby tubes extending from one outside face of one tube sheet to the outside face of the opposite tube sheet pass through these aligned holes. The holes in the tube sheets and baffles are drilled with a very close tolerance of a few thousandths of an inch larger in diameter than the outside diameter of the tubes. The baffle holes are usually slightly larger than the tube sheet holes.

The tubes become fouled with deposited materials on the outside surfaces in use and require considerable force to remove them for cleaning or retubing.

The present procedures for cleaning or retubing bundles requires that the bundle be removed from the shell, conveyed to the repair area, each tube forced out individually by a hammering effect applied with a tool onto the end of the tube and pulling the tube by hand after it becomes loose as it is progressively forced from the bundle. Some can be removed easily but many require considerable pounding and pulling throughout the process of removal of the tube. This is very time consuming and requires 4 men, 16 hours, for example, to pull the tubes from a thousand tube bundle. In some instances the tubes are flared or bulged at the ends from pounding to the extent that they will not pull through the succeeding baffle hole and must be cut off which results in the destruction of the tube. These are expensive alloy tubes in most instances. For example, a ¾" x 16' cupro nickel tube costs $8.50. It is then necessary to perform the operation of inserting cleaned or new tubes into the bundle which requires 4 men, 8 to 12 hours time, to insert the tubes in a 1000 tube bundle. Each tube end must be guided through each hole in the baffles by one person while another forces the tube through the bundle. The successive operations of cleaning causes damage to many tubes from the pounding and after 4 to 5 of these operations many of the tubes become destroyed.

There are many services where the cleaning frequency is every 30 to 60 days and subsequent tube life is less than a year.

My invention and method make it possible to remove and insert tubes simultaneously without any damage to the tubes and to provide perfect alignment between the tube being displaced and the displacing tube. For example a 1000 tube bundle can be completely displaced by clean or new tubes in 8 hours time with not more than three men performing the operation. This is a 24 man-hour job, whereas under the present method, it requires a 96 man-hour job for the same size bundle and many tubes are destroyed. Furthermore, more impact force can be imposed upon the tubes than is now used without any damage to the tubes.

Other objects and features of novelty will be apparent from the following specification when read in connection with the accompanying drawings in which certain embodiments of the invention are illustrated by way of example.

In the drawings:

FIG. I is fragmentary longitudinal sectional view showing the combination tube extractor and tube inserting elements of the driven type disposed in the tubes before the tubes are locked together.

FIG. II is a fragmentary longitudinal sectional view showing the driven type combination tube extractor and tube inserting tool locked in place in the two tubes and showing partial displacement of the tube in the bundle by the free tube to be inserted in its place.

FIG. III is a fragmentary longitudinal sectional view showing the combination tube extractor and tube inserting tool elements of the pulling type disposed in the tubes before the tubes are locked together.

FIG. IV is a fragmentary longitudinal sectional view showing the pulling type combination tube extractor and tube inserting tool locked in place in the two tubes and indicating the partial displacement of the tube in the bundle by the free tube to be inserted in its place.

FIG. V is a fragmentary longitudinal sectional view of the driven type tube extractor and tube inserting tool showing a shoulder stop on the wedging bevels for limiting the radial forces of the wedging action.

Referring to FIG. 1 of the drawings, the numeral 1 indicates a rod with a square shouldered recess 2, and a beveled end 3, which has a companion bevel to the bevel 4 on a similar rod 5. Tube 6 is the free clean displacing tube and tube 7 is the tube to be displaced from the tube sheets 8 and 9. The numerals 10 and 11 indicate the protruding ends of the rods 5 and 1 respectively. The numeral 12 indicates a square shoulder on recess 2. The numeral 13 indicates an O-ring seal between tube 6 and tube sheet 8.

The conventional procedure in removing the tubes of the type where the tube is not fixed to the tube sheet by expanding or welding, is to use an impact tool with a shoulder that abuts the end of the tube and impact force is applied either with a hammer or air driven motor striking the end of the impact tool to drive the tube from the bundle as men grasp the tube as it emerges from the tube sheet at the opposite end of the bundle and pull on the tube until it is displaced from the bundle. This operation is continued until all tubes are removed from the bundle. Some tubes are fouled and offer resistance to the extent that the impact tool flares the end of the soft metal tubes which are usually constructed of soft admiralty metal or cupro-nickel materials. The clean or new tubes, as the case may be, are then threaded into the bundle by one man pushing the tube first through the hole in the tube sheet, and then it is guided through the holes in the baffles and into the hole of the opposite tube sheet by another person. The holes for ¾" outside diameter tubes are on one inch center to center spacing which makes the tube holes only ¼" apart in the tube sheet and correspondingly aligned holes in the baffles which are alternately spaced from 12 inches to 36 inches apart in conventional bundles of 16 to 20 feet in length. Four men working in pairs on each side of the bundle are usually used to thread a bundle. This requires that each pair move back and forth over 16 feet when inserting a cleaned or new tube in a 16 foot bundle. My tube displacing and tube inserting tool will eliminate the moving time of the men and the flaring damage to the tubes, and makes it possible to insert the cleaned or new tube simultaneously with the displacement of the fouled or condemned tube. This latter procedure eliminates the subsequent threading up time of the bundle as well as allowing more impact force upon the tubes being displaced for faster displacement of same.

Referring to FIG. I, the operation of displacing the fouled tube 7 by the free cleaned tube 6 is performed by one person standing at the outside face of tube sheet 9 and forcing the rod 5 through the tube 7 with the bevel 4 comprising the lead end. At the same time a person standing at the outside face of the tube sheet 8 at the other end of the bundle pushes the rod 1 through the free cleaned or new tube 6 with the lead end of the rod 1 having the square shouldered recess 2. The companion beveled ends 3 and 4 are matched up where they protrude from the tubes as shown in FIG. I and the tube 6 is sleeved over the rod 1 to abut the end of tube 7. This alignment and abutting of the two tubes is very important and they should remain positioned as such throughout the operation of removing a tube from the bundle and inserting another simultaneously. If the tube being inserted is spaced at all from the tube being removed, the very serious problem of the tube end hanging up on a baffle occurs when the distance between the tubes is greater than the usual ¼" thickness of the baffles. The end 10 is tapped with a hammer or air driven impact tool while a backing up instrumentality is held against end 11 which results in the wedging of the rods 1 and 5 at the bevels 3 and 4 against the inside walls of tubes 6 and 7 as shown in FIG. II. These rods 1 and 5 are in very close tolerance with the inside of the tubes and a tremendous friction hold is obtained between these surfaces by the transverse radial forces produced by the wedging action of the bevels 3 and 4. An air driven impact motor is placed in contact with end 11 and the displacement of tube 7 and insertion of tube 6 is started by the impact motor driving the two tubes until the fouled or condemned tube 7 is completely clear of tube sheet 9 and tube 6 is seated in its place.

The shoulder 12 of recess 2 is struck with a flat instrument to provide the impact force to unwedge the rods 1 and 2 at bevels 3 and 4. The protruding end of rod 1 is grasped and pulled from tube 6 and inserted into another free clean tube and pushed through the tube until bevel 3 clears the end of the inserted tube. At the same time the rod 5 is pulled from the displaced tube and pushed through the next tube to be removed from the bundle until bevel 4 reaches the position as shown in FIG. I and the operation described above is repeated to remove and insert the two tubes simultaneously.

Referring to FIG. III, the mode of operation of displacing the tube 7 by the free cleaned or new tube 6 is similar in all respects to the operation as described for FIG. I except this tool is adapted for the application of a pulling force by attaching any suitable pulling tool to the protruding end 10 of rod 5 and a hold back force is applied to the protruding end 11 of rod element 1 until the wedging friction action is produced by the companion bevels 3 and 4. Also rod element 1 is provided with key 14 in the recess 2 and the key having a square shoulder 15 to abut the end 16 of the tube 6 and to be wedged in place by the companion bevels 17 and 18 when the protruding end 10 has an applied pulling force. The unwedging action is performed by striking the end 10 of rod 5 with any suitable impact element.

Referring to FIG. V, the purpose and function of the shoulder stop 19 is to limit the wedging action of bevels 3 and 4 on the inside surfaces of the tubes to prevent excessive transverse radial forces that will expand the softer metal tubes when face 20 of rod 1 abuts the said shoulder stop 19 on rod 5 after a predetermined amount of lateral movement of rods 1 and 5 inside the tubes has been reached.

The cooperating rods 1 and 5 may be considered as together forming an expansion mandrel for the purposes described, each of the rods constituting a mandrel-half.

It is obvious that minor changes in the details of construction can be made without departing from the spirit of my invention.

Having fully described my invention and its mode of operation, I claim:

1. Means for simultaneously extracting an old heat exchanger tube from its position within the openings in spaced tube sheets and replacing it with a new tube, said means comprising a mandrel device consisting of a pair of interengageable mandrel rods, each of said rods being of somewhat greater length than that of one of the tubes and of an outside diameter but slightly smaller than the inside diameter of the tubes, no part of either rod being of greater diameter than the inside diameter of said tubes, one of said rods adapted to be inserted within the old tube with one of its ends protruding from the old tube in the direction of withdrawal of the tube, and its other end at the opposite end of the old tube provided with a longitudinally extending bevelled surface; the other of said rods adapted to be inserted within the new tube with one of its ends protruding from the new tube in the direction opposite to the replacing movement of the new tube, the other end of the second named rod at the opposite end of the new tube being provided with a longitudinal bevelled surface complementary to the bevelled surface of the first named rod and interfitting therewith when the old and new tubes are brought into end-abutting relationship; the wedging interfit of the bevelled ends of the rods serving to effect internal gripping of the tubes for longitudinal forced movement thereof and at the same time to buttress the walls of both tubes to prevent distortion of the tube walls as they are forced simultaneously through the openings in the tube sheets, a protruding end of said second named rod being provided with a shoulder depressed within its periphery which is adapted to be impacted in the opposite direction to the movement of the tubes in order to break the wedging interlock of the bevelled rod ends, as when the new tube is ultimately in place.

2. Means as set forth in claim 1 in which the respective coacting bevelled surfaces face backwardly toward the main portions of their rods to provide in effect interlocking hooked ends for the rods, and thus a pulling force on the old tube rod is effective to interlock the rods and wedge the tube walls.

3. Means for simultaneously extracting an old heat exchanger tube from its position within the openings in spaced tube sheets and replacing it with a new tube, said means comprising a mandrel device consisting of a pair of interengageable mandrel rods, each of said rods being of somewhat greater length than that of one of the tubes and of an outside diameter but slightly smaller than the inside diameter of the tubes, no part of either rod being of greater diameter than the inside diameter of said tubes, one of said rods adapted to be inserted within the old tube with one of its ends protruding from the old tube in the direction of withdrawal of the tube, and its other end at the opposite end of the old tube provided with a longitudinally extending bevelled surface; the other of said rods adapted to be inserted within the new tube with one of its ends protruding from the new tube in the direction opposite to the replacing movement of the new tube, the other end of the second named rod at the opposite end of the new tube being provided with a longitudinal bevelled surface complementary to the bevelled surface of the first named rod and interfitting therewith when the old and new tubes are brought into end-abutting relationship; the wedging interfit of the bevelled ends of the rods serving to effect internal gripping of the tubes for longitudinal forced movement thereof and at the same time to buttress the walls of both tubes to prevent distortion of the tube walls as they are forced simultaneously through the openings in the tube sheets, the respective coacting bevelled surfaces facing backwardly toward the main portions of their rods to provide in effect interlocking hooked ends for the rods, and thus a pulling force on the old tube rod is effective to interlock the rods and wedge the tube walls, and a latch-hook attachment seated in a recess in the new tube rod and adapted to project transversely therefrom to engage the new tube end.

4. The method of simultaneously removing an old heat exchanger tube from its tube sheets and inserting a new tube in its place, which comprises end-abutting the two tubes; inserting an expansion mandrel through the aligned tubes; expanding the mandrel in the vicinity of the abutting tube ends, only to the point of obtaining wedging interlocking of the tubes and expansion mandrel and the reinforcement of the tube walls against distortion; and then applying force to the resulting assembly of tubes and expansion mandrel in the direction longitudinally of the tubes to slidingly remove the old tube and bring the new one into position.

5. The method as set forth in claim 4 in which the expansion mandrel comprises two half-mandrels and the steps include inserting one of said half-mandrels into each of the tubes with opposite ends of the respective half-mandrels protruding from remote ends of the two tubes, applying an impact force to the protruding end of one of said half-mandrels to interlock them and produce the required expansion and after the tubes have been moved to their ultimate positions applying an opposite impact force to one of said half-mandrels to disengage them.

References Cited
UNITED STATES PATENTS

| | | | |
|---|---|---|---|
| 1,201,064 | 10/1916 | McGuckin | 29—275 |
| 1,290,361 | 1/1919 | Rothholz | 242—72.1 |
| 1,400,676 | 12/1921 | Gully | 29—275 |
| 1,504,650 | 8/1924 | Smith | 29—280 |
| 1,667,227 | 4/1928 | Thompson | 29—275 |
| 1,981,925 | 11/1934 | Russell et al. | 29—275 |
| 2,682,103 | 6/1954 | Hamilton | 29—275 |
| 3,034,740 | 5/1962 | Larsen | 242—72.1 |
| 3,057,631 | 10/1962 | La Fleur | 29—282 X |

CHARLIE T. MOON, *Primary Examiner.*